Nov. 5, 1968

S. STEIN 3,408,816

ROCKET ENGINE INJECTOR

Filed Oct. 31, 1966

INVENTORS
SAMUEL STEIN

BY

ATTORNEYS

Nov. 5, 1968   S. STEIN   3,408,816
ROCKET ENGINE INJECTOR

Filed Oct. 31, 1966   2 Sheets-Sheet 2

INVENTORS
SAMUEL STEIN

BY
*Allen E. Coy*
*Gene E. Shook* ATTORNEYS

United States Patent Office

3,408,816
Patented Nov. 5, 1968

3,408,816
ROCKET ENGINE INJECTOR
Samuel Stein, Cleveland, Ohio, assignor to the United States of America as represented by the Administrator of the National Aeronautics and Space Administration
Filed Oct. 31, 1966, Ser. No. 591,014
5 Claims. (Cl. 60—240)

ABSTRACT OF THE DISCLOSURE

Maintaining the mass flow rate of propellant into a rocket combustion chamber substantially constant as propellant temperature changes by automatically varying the cross-sectional area of the injector orifice to accommodate changes in density, velocity, and pressure.

---

Figure 1:
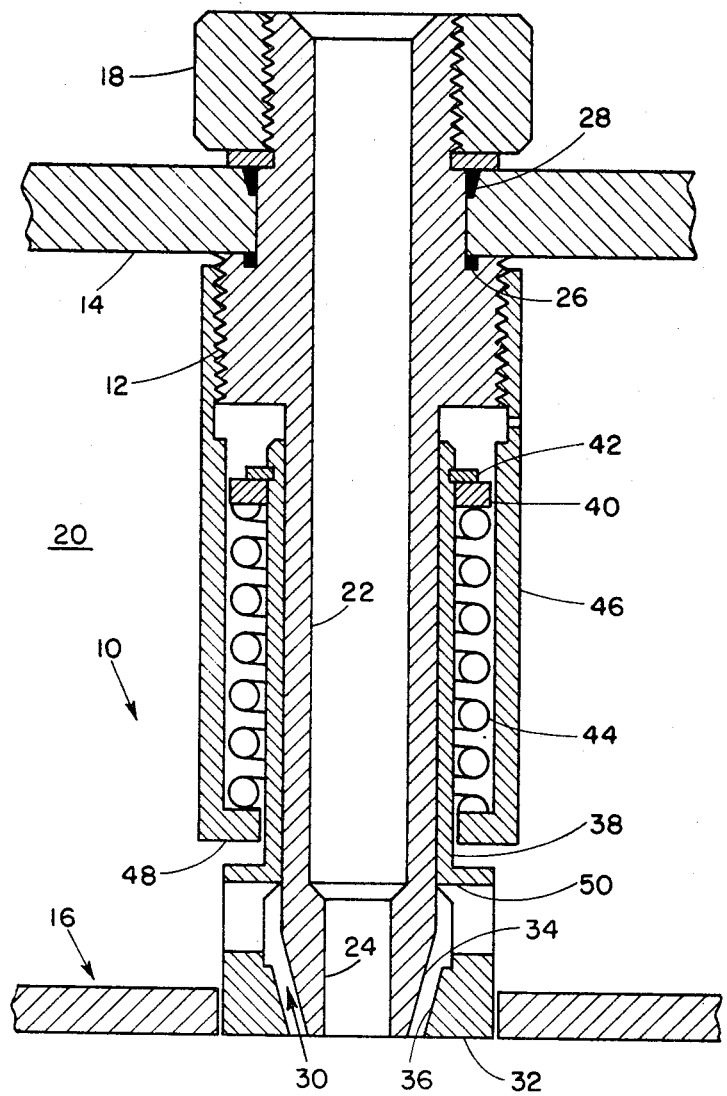

The invention described herein was made by an employee of the United States Government and may be manufactured and used by or for the Government for governmental purposes without the payment of any royalties thereon or therefor.

This invention relates to the injection of propellants into a rocket engine combustion chamber. More particularly, the invention is concerned with the control or regulation of the flow of a liquid rocket propellant to compensate for changes in density.

An injector for a rocket engine usually has one or more elements with fixed area orifices through which the propellants flow into the combustion chamber. Certain problems have been encountered with the use of such orifices because of changes in the temperature of the propellants. It has been found that the temperature of a liquid propellant is significantly higher during the starting portion of a rocket engine run due to the initial cooling of various engine components by the propellant. This temperature increase in the propellant produces a density decrease.

In general, for the flow of fluids through a fixed area orifice in which the pressure differential causing the flow remains constant, a decrease in density will cause a decrease in the mass flow rate in pounds per second. However, in the case where the fluids are propellants and their reaction affects the pressure differential causing flow through the fixed area orifice, a decrease in density will initially cause a decrease in the mass flow rate. This, in turn, creates a greater pressure differential which will then produce a higher flow rate. Such an increase in propellant flow will create a smaller pressure differential which will again reduce the flow rate. This alternating phenomena continues and sustains itself on a self-exciting basis.

Another problem arising with the use of conventional injectors is that certain of these have a sensing device located at or near the injector but not at the plane of injection. Such devices do not reflect actual flow conditions at the plane of injection, and they are unable to detect any variations of flow conditions at each point of injection.

These problems have been solved by the injector of the present invention which utilizes elements having variable area orifices. The area of each orifice is altered automatically to accommodate changes in density, velocity and pressure.

It is, therefore, an object of the present invention to provide a rocket engine injector element which automatically regulates the flow of propellant at each point of injection to reduce excitation sources of combustion chamber pressure oscillations.

Another object of the invention is to provide a rocket engine injector which is self-sensing to changes in density, velocity and pressure of the propellant and is self-actuated in adjusting for a predetermined flow rate.

A further object of the invention is to provide a rocket engine injector in which sensing and actuation functions take place at the plane of propellant entry into the engine combustion chamber at each point of entry for uniformity of flow across the injector face.

A still further object of the invention is to provide a rocket engine injector which acts to introduce a phase lag to dampen combustion chamber pressure oscillations.

These and other objects of the invention will be apparent from the specification which follows and from the drawings wherein like numerals are used throughout to identify like parts.

Figure 2:
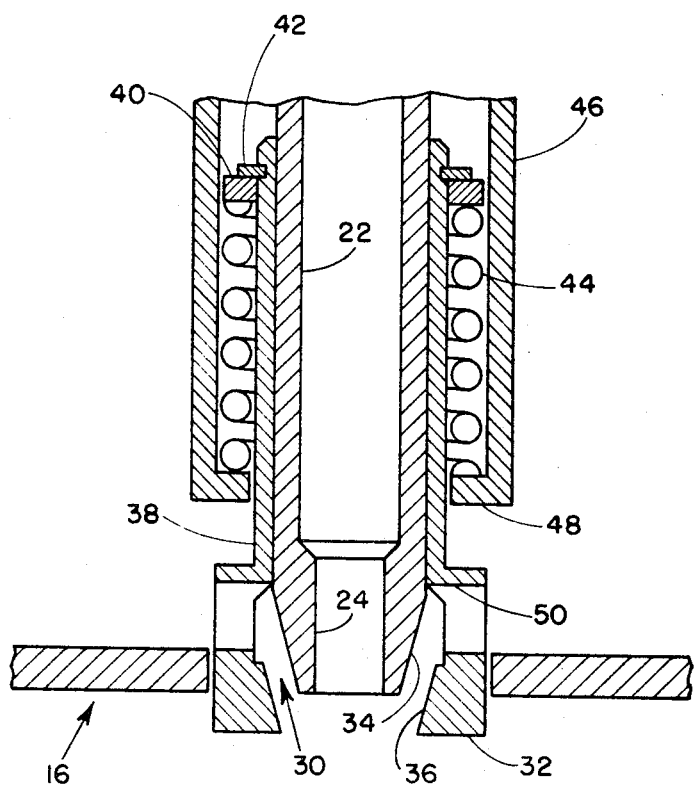

In the drawings:

FIG. 1 is an enlarged sectional view of a rocket engine injector element constructed in accordance with the present invention; and FIG. 2 is an enlarged sectional view similar to FIG. 1 showing the relative positions of injector element parts as a rocket engine is started.

Referring now to the drawings, there is shown in FIG. 1 an injector element 10 constructed in accordance with the present invention. The injector element 10 has a tubular member 12 which extends between a back wall 14 and a face plate 16 of an injector located at one end of a rocket engine combustion chamber. The tube 12 is rigidly mounted on the back wall 14 by a nut 18. A plenum chamber 20 is formed between the back wall 14 and the face plate 16 for containing a propellant, such as liquid hydrogen.

Another propellant, such as liquid oxygen, is stored on the opposite side of the back wall 14 from the plenum chamber 20. The liquid oxygen passes through the bore 22 of the tube 12 to a reduced diameter passage 24 which terminates in the plane of the surface of the face plate 16. Seals 26 and 28 prevent entry of the liquid oxygen into the plenum chamber 18.

The liquid oxygen is injected as a cylindrical stream through the bore 22 and the passage 24 into the combustion chamber. The liquid hydrogen is injected through an annular orifice 30 to form a tubular stream around the liquid oxygen in a coaxial manner as described in U.S. Patent No. 3,136,123.

The annular orifice 30 is formed by an opening in an orifice plate 32. An end portion of the tubular member 12 extends into this opening and has a tapered surface 34 which forms a generally truncated conical configuration. A centrally disposed opening in the orifice plate 32 has a contoured surface 36 which mates with the tapered surface 34 on the end of the tubular member 12. The positioning of the contoured surface 36 with respect to the tapered surface 34 determines the area of the annular opening 30. Thus, the conical annular passage 30 constitutes a variable area orifice, and the longitudinal positioning of the orifice plate 32 with respect to the tube 12 determines the area of opening.

The orifice plate 32 is mounted for reciprocable movement along the axis of the injector element 10 in a suitable opening which extends through the injector face plate 16. The orifice plate 32 has a sleeve 38 which receives the tubular member 12. The sleeve 38 is free to slide along the tubular member 12. A retaining ring 40 is mounted on the end of the sleeve 38 remote from the rocket combustion chamber. The retaining ring 40 is held in place by a snap ring 42.

A coil spring 44 encircles the sleeve 38 and is enclosed by a retaining housing 46 that is rigidly mounted on the tubular member 12. One end of the spring 44 engages an inwardly turned flange 48 on the housing 46 while the opposite end of the spring engages the retaining ring 40.

The spring 44 is selected so as to enable the orifice plate 32 to move from an extended position shown in FIG. 2 at the start of the engine firing to a retracted position shown in FIG. 1. More particularly, as the orifice plate 32 moves to the extended position shown in FIG. 2 the spring 44 is compressed between the retaining ring 40 and the flange 48. The spring 44 exerts a restoring force against the retaining ring 40 which moves the sleeve 38 and orifice plate 32 to the retracted position shown in FIG. 1. In this manner the compression spring 44 opposes an increase in the area of the annular orifice 30.

The annular opening 30 is placed in communication with the plenum chamber 20 by suitable ports 50 which extend through the orifice plate 32. Fuel from this chamber passes through the ports 50 and flows into the combustion chamber through the annular orifice 30 thereby providing a cooling film for the exposed surface of the orifice plate 32 when it projects from the injector face as shown in FIG. 2.

Referring to the present invention the extended position of the orifice plate 32 shown in FIG. 2 presents a suitable area of the annular orifice 26 for low density fuel at the start of the rocket engine. After the rocket engine has been started the fuel reaches the injector at a lower temperature and a higher density. These changes are sensed by the orifice plate 32 which positions itself accordingly. When the fuel has reached its maximum density, the orifice plate 32 is at the position shown in FIG. 1 thereby affording a small orifice area.

When a pressure differential exists between the injection pressure in the plenum 20 and the combustion chamber pressure through an injector element 10 constructed in accordance with the present invention, the orifice plate 32 is positioned proportional to this differential pressure. The restoring force of the spring 44 is also proportional to the differential pressure. The mass flow rate commensurate with the differential pressure determines the chamber pressure. The mass flow rate is equal to the product of orifice area, propellant density and flow velocity. The pressure differential and the spring force are proportional to the propellant density×flow velocity.$^2$ The mass flow rate is proportional to the spring force, and the difference between the differential pressure at the beginning and the end of the firing is reflected in the combustion chamber pressure. Depending on the specific application, this difference can be made small as desired; on the order of 25 p.s.i., for example. In such an example, the chamber pressure could be 575 p.s.i. initially and finalize at 600 p.s.i. It will be appreciated that the operational characteristics can be varied to meet specific fuels, installations and the like.

In a conventional injector the fuel may be metered to the rocket engine at a uniform mass flow rate with the injection pressure slightly higher than that required for this mass flow rate through the injector. When this occurs the chamber pressure is increased beyond that commensurate with the mass flow rate at the metering point. Because this higher chamber pressure cannot be maintained for the metered flow rate, the chamber pressure must necessarily drop beyond the normal value. This provides an excessive pressure differential, and the oscillation continues on a self-excited basis.

With an injector element constructed in accordance with the present invention these oscillations cannot readily occur because the injection pressure is more readily controlled. Also, the pressure differential versus flow rate relationship remains relatively constant over the entire density range.

An injector element constructed in accordance with the invention can also dampen combustion chamber pressure oscillations when such oscillations result from the acoustic property of the chamber and are not induced by or dependent on a pulsating flow.

In a conventional injector element, the chamber oscillation causes a corresponding propellant flow variation. By way of illustration, assume the propellant flow is phased so that in the vibration cycle as the chamber pressure increases the burning rate also increases due to flow changes and burning rate changes which can drive or sustain the oscillation. If the spring 44 and orifice plate 32 have a lower natural frequency than that of the exciting chamber pressure force, the direction of motion of the orifice plate will be 180° out of phase with the exciting force. Thus, during a vibration cycle the orifice plate will open further as the chamber pressure increases. This will cause a pulsating flow of propellant to oppose the exciting force in a manner analogous to a damped vibration absorber.

To illustrate the beneficial technical effect of the invention injection parameters for a variable area orifice are set forth in Table I. The fuel is considered to be at 190° R. when the rocket engine is started and at a final temperature of 60° R. This corresponds to a density increase of about ten times. By providing a small ramp in chamber pressure from 270 p.s.i.a. for fuel at 190° R.

TABLE I

| Injection Pressure, p.s.i.a. | Combustion Chamber Pressure, p.s.i.a. | Pressure Change, ΔP | Mass Flow Rate, Lb./Sec. | Flow Area, In.$^2$ | Density, Lbs./ft.$^3$ | Temperature, ° R. |
|---|---|---|---|---|---|---|
| 350 | 270 | 80 | 0.496 | 0.1518 | 0.347 | 190 |
| 350 | 275 | 75 | 0.506 | 0.1355 | 0.417 | 160 |
| 350 | 280 | 70 | 0.516 | 0.1205 | 0.590 | 120 |
| 350 | 285 | 65 | 0.526 | 0.1056 | 0.858 | 93 |
| 350 | 290 | 60 | 0.535 | 0.0912 | 1.289 | 77 |
| 350 | 295 | 55 | 0.544 | 0.0772 | 2.029 | 69 |
| 350 | 300 | 50 | 0.553 | 0.064 | 3.630 | 60 | to 300 p.s.i.a. for fuel at 60° R., a constant injector pressure of 350 p.s.i.a. can be employed. The tabulated valves in Table I indicate the relationship of density being the determinant for flow area to provide the mass flow rate for developing the commensurate chamber pressure.

While a preferred embodiment of the invention has been described, it will be appreciated that various structural modifications can be made to the disclosed injector without departing from the spirit of the invention or the scope of the subjoined claims.

What is claimed is:

1. In combination with a rocket engine having a combustion chamber,
   a source of propellant at a substantially constant pressure,
   an injector element in communication with said source having an orifice at one end of the combustion chamber for directing pressurized propellant, said injector element comprising
   a fixed tubular member having a peripheral surface extending about a centrally disposed bore for conveying propellant and injecting the same as a cylindrical stream into the combustion chamber,
   a movable member having a mating surface facing said peripheral surface for forming said orifice so that propellant is injected in the form of a tubular stream about said cylindrical stream, said movable member being slidably mounted on said fixed tubular member for reciprocable movement toward and away from the combustion chamber to change the spacing between said surfaces, and means responsive to changes in propellant density for sliding said movable member along said fixed tubular member thereby varying the cross-sectional area of said orifice so that the mass flow rate of propellant remains substantially constant as the propellant temperature changes.

2. Apparatus as claimed in claim 1 wherein the movable member comprises:
an orifice plate adjacent an end of the combustion chamber, and
a sleeve rigidly secured to said orifice plate, said sleeve being slidably mounted on the fixed tubular member.

3. Apparatus as claimed in claim 2 wherein the fixed tubular member has a tapered peripheral surface adjacent the end thereof at the combustion chamber and the orifice plate has a centrally disposed opening for receiving said end of the tubular member thereby forming an annular orifice, said opening having a contoured surface for mating with said tapered surface.

4. Apparatus as claimed in claim 3 wherein the injector element includes biasing means for moving the sleeve along the fixed tubular member away from the combustion chamber thereby moving the orifice plate toward the tubular member to move the contoured surface toward the tapered surface to decrease the size of the orifice.

5. Apparatus as claimed in claim 4 wherein the biasing means comprises a compression having one end operably connected to a sleeve and the other end operably connected to the tubular member so that said spring is compressed when the orifice plate moves away from the tubular member to increse the cross-sectional area of the orifice.

References Cited

UNITED STATES PATENTS

| | | | |
|---|---|---|---|
| 2,513,720 | 7/1950 | Hallinan | 239—75 |
| 2,775,484 | 12/1956 | Fox | 239—75 |
| 2,995,008 | 8/1961 | Fox | 60—240 |
| 3,150,485 | 9/1964 | Hickerson | 60—258 |
| 3,232,049 | 2/1966 | Rhodes | 60—39.27 |
| 3,323,308 | 6/1967 | Greco | 60—240 |
| 3,344,605 | 10/1967 | Mageean | 60—258 |

MARTIN P. SCHWADRON, *Primary Examiner.*

DOUGLAS HART, *Assistant Examiner.*